Figure 1:
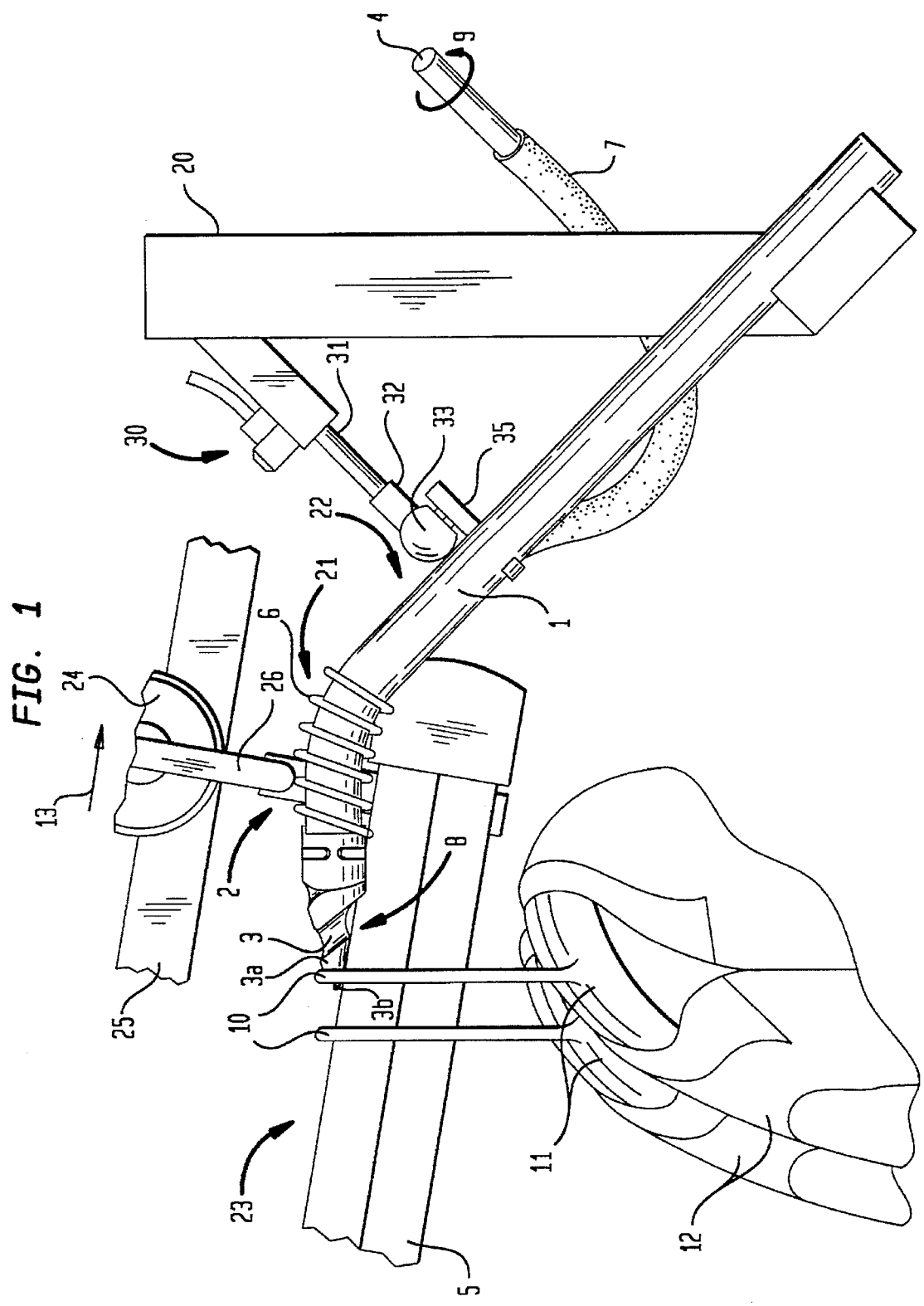

United States Patent [19]
Gaertner

[11] Patent Number: 5,647,475
[45] Date of Patent: Jul. 15, 1997

[54] TAKE-OVER APPARATUS

[76] Inventor: Franz Gaertner, Muehlweg 10, 97656 Obereisbach, Germany

[21] Appl. No.: 507,816

[22] Filed: Jul. 27, 1995

[30] Foreign Application Priority Data

Jul. 29, 1994 [DE] Germany .................... 44 27 027.5

[51] Int. Cl.⁶ .................................................. B65G 29/00
[52] U.S. Cl. ................................ 198/465.4; 198/370.1
[58] Field of Search .................... 198/360, 370.01, 198/370.03, 370.1, 465.4, 659

[56] References Cited

U.S. PATENT DOCUMENTS

| 3,247,952 | 4/1966 | Kozlosky | 198/360 |
| 3,580,378 | 5/1971 | Pedersen | 198/465.4 |
| 3,982,623 | 9/1976 | DePas et al. | 198/362 |

FOREIGN PATENT DOCUMENTS

| 0 005 539 | 5/1979 | European Pat. Off. | B65G 47/10 |
| 0492465 | 7/1992 | European Pat. Off. | 198/465.4 |
| 3807280 C1 | 3/1988 | Germany | B65G 47/36 |
| 3934995 C1 | 10/1989 | Germany | B65G 47/36 |
| 3935487 A1 | 10/1989 | Germany | B65G 47/36 |
| WO 93/24398 | 12/1993 | WIPO | B65G 47/36 |

*Primary Examiner*—James R. Bidwell
*Attorney, Agent, or Firm*—Mathews, Collins, Shepherd, & Gould, P.A.

[57] ABSTRACT

The invention relates to a take-over apparatus for goods suspended from hooks and transported with a suspension transporting apparatus, particularly for items of clothing hanging on clothes hangers, in order to take over the hooks, which overlap a carrier rod, from this carrier rod and transport them to a release rod with a descending course, the release rod having an end region, which can be set against the carrier rod and, with its free end, can grasp the hooks from below, and a device for transporting the hooks along the end region of the release rod being provided, the free end of the end region of the release rod being constructed as a rotatable worm, which is driven by driving means disposed in the end region, in order to take hold of a hook overlapping the carrier rod.

9 Claims, 2 Drawing Sheets

TAKE-OVER APPARATUS

The invention relates to a take-over apparatus for goods, suspended from hooks and transported with a suspension apparatus, as described in the introductory portion of claim 1.

Such an apparatus is known from DE 39 34 995 C1. The take-over apparatus disclosed therein is constructed for goods suspended from a hook, the hooks overlapping a carrier rod of a trolley suspended from a rail. This take-over apparatus has a release rod, which follows a descending course and has at its upper end a downwardly bent end region for taking over the goods from a carrier rod of a trolley. In the transfer position, this end region of the release rod can be placed against the carrier rod of the trolley in the transfer position, the hooks suspended from the carrier rod being gripped from below. This end region is disposed in the form of a ramp ascending at the easier rod, so that the hooks are lifted from the carrier rod. For lifting the hooks, a worm conveyor is provided, which runs parallel to the end region of the carrier rod, so that the hooks, suspended from the end region of the carrier rod, are taken hold of by the worm conveyor and transported upwards up to the descending course of the release rod, so that the hooks and the goods suspended therefrom continue to slide under their own weight. The end region of the carrier rod is constructed so that it can be swung away from the carrier rod. During the swinging motion, the electric motor driving the worm conveyor must also be swung along, so that each swinging motion moves a large mass. Moreover, this take-over apparatus has a mechanism for stopping the trolley or moving it forward slowly, so that these hooks can be picked up individually from the end region of the release rod.

It is an advantage of this apparatus that the hooks can be separated by the swiveling motion of the release rod and the placing of the release rod against the carrier rod. However, it is a disadvantage that, when the hooks are taken hold of on the ramp-like, ascending end region of the release rod, they are squeezed between the end region and the worm; the hooks are not always taken hold of immediately, so that the process of separating or isolating them is delayed and hooks of different thickness, particularly thin wire hooks and plastic hooks of high material strength, cannot be conveyed with the same worm type. Moreover, the relatively large mass, which must be moved during the swiveling process, limits the frequency, with which the hooks are isolated or separated.

In the U.S. Pat. No. 3,982,623, a further take-over apparatus for goods hanging on hooks is described, for which the hooks are conveyed by a threaded rod, which is driven by a motor. With this take-over apparatus also, a descending release rod is provided, which extends in an arch a little above the threaded rod, so that a finger, hinged to the release rod, can be placed against the threaded rod, which conveys the hooks, and be tilted out of the way by this rod. If the finger is set against the threaded rod, the hooks conveyed by the threaded rods are taken hold of from below by the finger. A helical spring with the same pitch as the thread of the threaded rod is mounted at the threaded rod and extends about the threaded rod and the pivotable finger, so that the hooks on the finger are conveyed up the ramp-like, ascending finger by the helical spring, from where they are passed on to the descending release rod.

This take-over apparatus has the advantage that its construction is relatively simple and only one small finger has to be moved back and forth for isolating the hooks. However, such a take-over apparatus is suitable only for suspension-type conveying apparatuses, for which the hooks are transported on a threaded rod driven by a motor, but not for suspension-type apparatuses, for which the hooks are hanging on a rod, which is not rotating, such as is the case, for example, with suspension-type conveying apparatuses with trolleys, which must be moved along a rail and have a carrying rod, from which the hooks hang.

It is an object of the invention to construct a take-over apparatus of the introductory portion of claim 1 in such a manner, that it is possible to separate or isolate the hooks rapidly and without any problems, which overlap a carrying rod that is not rotating.

This objective is accomplished by the distinguishing features of claim 1.

By constructing the end region of the carrier rod as a worm that can rotate, the hooks are taken hold of directly by the rotating, exposed worm, so that any hooks can be separated or isolated. The isolation of the hooks is completely free of problems, since the hooks do not have to be clamped between a guide and a worm, as is the case in the generic state of the art according to DE 39 995 C1.

When applying the end region of the release rod, only a small mass is moved. For this reason, the swiveling process can be carried out very quickly and a high separation or isolation frequency is achieved.

Preferably, the take-over apparatus is constructed with a helical spring of claim 3, so that the hooks, after they have been taken up by the worm, are transported further on the release rod by the helical spring.

The use of the inventive take-over apparatus for a suspension-type transporting apparatus with trolleys, for which the hooks are suspended from a carrier rod, has the advantage that the hooks suspended from the carrier rod are set in motion by the rotating worm without having to set the carrier rod of the trolley at an angle for this purpose, so that the hooks slide onto the release rod. The carrier rod thus does not have to be moved for isolating or separating the hooks and can even be covered with an anti-slip coating, which prevents sliding of the hooks on the carrier rod while the trolleys are moving.

Advantageous refinements of the invention are evident from the dependent claims and from the specification.

Figure 2:
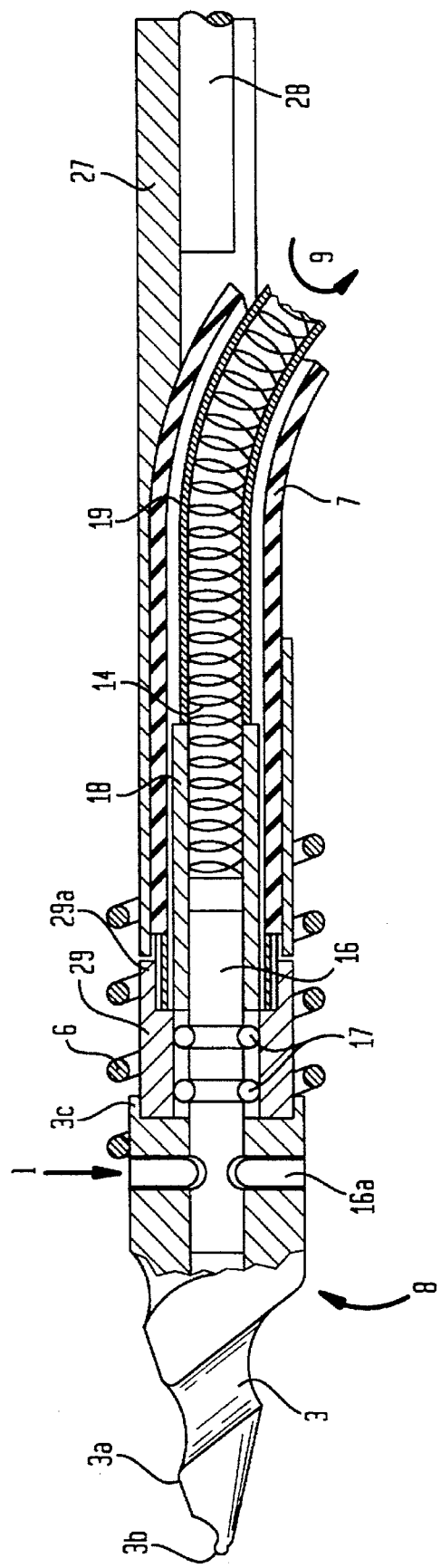

Examples of the invention are described in greater detail by means of the drawing, in which FIG. 1 shows an inventive take-over apparatus, which is applied to a carrier rod of a trolley and FIG. 2 shows a release rod in cross section, particularly with its end region.

The inventive take-over apparatus is intended for suspension-type conveying apparatuses, which transport goods suspended from hooks, particularly items of clothing 12 hanging on clothes hangers 11 (FIG. 1). The hooks 10 overlap a carrier rod 5 here, from which they are taken over by a release rod with a descending course.

The release rod 1 is disposed with its end region 2 in the vicinity of a carrier rod 5, which is in the take-over position, the end region 2 forming an ascending region in the form of a ramp which, with an arch 21, goes over into a descending region 22 of the release rod 1. At the free end 8 of the end region 2, which can be positioned at a carrier rod 5 in the take-over position, a worm 3 is provided, which is rotated by driving means in the interior of the release rod 1. The worm 3, which preferably comes to a point, can thus grasp a hook 10 on the carrier rod 5 from below and receive it with its thread 3a, so that the hook 10 is pulled from the carrier rod 5 onto the release rod 1.

Preferably, adjoining the worm 3, there is a helical spring 6, which surrounds the end region 2 of the release rod 1 and extends over the arch 21. The helical spring 6 is connected nonrotationally with the worm 3 and its direction of rotation corresponds to that of the worm thread 3a, so that a hook 10, taken hold of by the worm 3, is conveyed by the rotational movement of the worm 3 and of the helical spring 6 from the tip 3b of the worm 3 over the end region 2 as far as over the arch 21 to the descending region 22 of the release rod 1, down which the hook 10 and the goods suspended therefrom slide due to their weight.

The release rod 1 is constructed from an elastic, tubular material 27, which is provided in the interior with a core 28. It is positioned in the room with several ribbon-shaped supports 20 (FIG. 1 shows only one ribbon-shaped support 20), bends and curves also being possible because of the elasticity of the tubular material. The placing of the worm 3 against a carrier rod 5 is carried out with a piston-cylinder arrangement 30, which is connected with the release rod 1 in the descending region 22 only a little below the arch 21. The cylinder-piston arrangement 30 preferably is driven pneumatically and arranged transversely to the release rod 1. A piston rod 31 of the arrangement 30 is connected over a ball-and-socket joint 32 with the release rod 1. The ball-and-socket joint 32 consists of a hollow spherical cap part 33, which is firmly connected with the piston rod 31, and of a ball, which locks positively with the spherical cap part 33 and is firmly connected with a shaft 34, which in turn is connected firmly with a plate-shaped flange 35, which protrudes laterally from the release rod 1, lies in a radial plane of the latter and is firmly connected with it. While the piston rod 31 is pulled in and out during the operation of the piston-cylinder arrangement 30, the linear back and forth motion of the piston rod 31 is converted over the ball-and-socket joint 32 and the flange 33 into a rotational motion of the piston rod or of the upper region of the latter about its central longitudinal axis.

With the piston-cylinder arrangement 30, the release rod 1 is shifted by rotation between two end positions. In the one end position, the worm 3 lies against a carrier rod 5, in order to be able to take over clothes hangers located thereon and, in the other end position, the worm 3 is at a distance from the carrier rod 5, so that a trolley 23 with its carrier rod 5 can pass by the worm 3 or the take-over apparatus.

As driving means for the worm 3 disposed in the end region 2 of the release rod 1, preferably a flexible shaft 4 is provided, which emerges from the release rod 1 through a pipe 7 at a place somewhat remote from the end region of the release rod 1. The pipe 7 guides the flexible shaft to a driving motor (not shown), which causes the shaft to rotate. In the case of the arrangement shown in FIG. 1, where the worm 3 is provided with a left-handed thread and is disposed, in the direction of movement of the trolleys (FIG. 13), to the right of the carrier rod 5, the tip of the worm, due to a counter-clockwise motion (arrow 9), rubs gently against the lateral profiled wall of the carrier rod 5 in the upward direction and can thus take up a hook 10.

The flexible shaft 4 consists of a coiled-up steel tow line 14, which is surrounded by an elastic sheath 19. The pipe 7, in which the flexible shaft 4 is guided, preferably is a metal pipe, which can be bent continuously with conventional bending tools from the place, where it penetrates into the release rod 1, up to the driving motor. The worm 3 is seated on a rigid shaft section 16, which is rotatably accommodated with the help of two bearings 17 in a short section 29 of the pipe of the release rod 1. The worm 3 is fixed on the shaft section 16 with a pin 16a, the worm 3 embracing the pipe section 29 with a short shoulder 30 of the pipe section 29 at the rear. As bearing 17, the usual ball bearings or rolling bearings or the like can be used. The tubular material 27 adjoins the pipe section 29 or a thin-walled pipe shoulder section 29a. Within this tubular shoulder section 29a and the tubular material 27 adjoining it, the rigid shaft section 16 is connected nonrotationally with the flexible shaft 4 by means of a sleeve 18, so that the rotational movement of the shaft 4 is transferred to the rigid shaft section 16 and the worm 3.

Instead of by a flexible shaft emerging from the interior of the release rod 1, the worm 3 can also be driven by an air motor, which is seated on the shaft section 16 and driven by compressed air supplied by a hose. Such a hose for supplying compressed air follows approximately the same course as the flexible shaft 4 shown here. An air motor is preferably used when the unit, which supplies the energy for driving the worm 3, that is, the compressor or the motor, is far removed from the place where the worm 3 is used, since compressed air can readily be transferred over larger distances.

The pipe section 29, the worm 3 and the helical spring 6 form a unit, which can be slipped onto the release rod 1 or its tubular material 27 and onto the pipe 7. A permanent connection between this unit and the release rod 1 on the one hand, and the tubular material 27 and the flexible shaft on the other, is assured by the sleeve 18, which embraces nonrotationally the rigid shaft section 16 as well as the flexible shaft.

The pipe section 29 preferably has the same cross-sectional shape as the release rod 1. The worm 3 is constructed to end in a point, its cross section gradually increasing up to the pipe section 29, so that the threaded groove of the worm thread 3a ends at the outer circumference of the pipe section 29.

A trolley 23, which is provided with a carrier rod 5, is guided on a rail 25, the trolley 23 being supported on the rail 25 by track wheels 24. Means 26, for suspending the carrier rod 26, extend downward from the track wheels 24. These suspension means preferably are constructed elastically, as described, for example, in the WO 93/24398.

I claim:

1. A take-over apparatus for goods suspended from hooks and transported with a suspension transporting apparatus, particularly for items of clothing hanging on clothes hangers, in order to take over the hooks, which overlap a carrier rod, from this carrier rod and transport them to a release rod with a descending course, the release rod having an end region, which can be set against the carrier rod and, with its free end, can grasp the hooks from below, and a device for transporting the hooks along the end region of the release rod being provided, characterized in that the free end of the end region of the release rod is constructed as a rotatable threaded worm, which is driven by driving means disposed in the end region, in order to take hold of a hook overlapping the carrier rod.

2. The take-over apparatus of claim 1, characterized in that the threaded worm is constructed to end in a point.

3. The take-over apparatus of claim 1, characterized in that a helical spring is connected nonrotationally with the threaded worm and extends rearwards from the threaded worm to the end region of the release rod, the helical spring being coiled in the same direction of rotation as the direction of rotation of the thread of the threaded worm.

4. The take-over apparatus of claim 1, characterized in that the driving means comprise a flexible shaft, which emerges from the release rod at a place remote from the end region of the release rod, and is driven by a motor.

5. The take-over apparatus of claim 1, characterized in that the driving means comprise an air motor, which is disposed in the end region of the release rod and is driven by compressed air supplied by a hose.

6. The take-over apparatus of claim 1, characterized in that the threaded worm is connected with a rigid shaft section, which is held rotatably in a pipe section by at least one bearing, such as a ball bearing.

7. The take-over apparatus of claim 1, characterized in that a swiveling device is provided for swiveling the threaded worm between two end positions, the threaded worm lying against the carrier rod, which is in the take-over position, in the one end position and the threaded worm being at a distance from this carrier rod in the other end position.

8. The take-over apparatus of claim 1, characterized in that the end region of the release rod ascends in ramp fashion and, with an arch, changes over into the descending course of the release rod.

9. Use of the take-over apparatus of claim 1 in a suspension transporting apparatus with trolleys, which are guided on a rail and, in each case, comprise a carrier rod for accommodating hooks.

* * * * *